E. KRAUSE.
SYSTEM OF MOTOR CONTROL.
APPLICATION FILED APR. 11, 1911.
1,025,812.
Patented May 7, 1912.
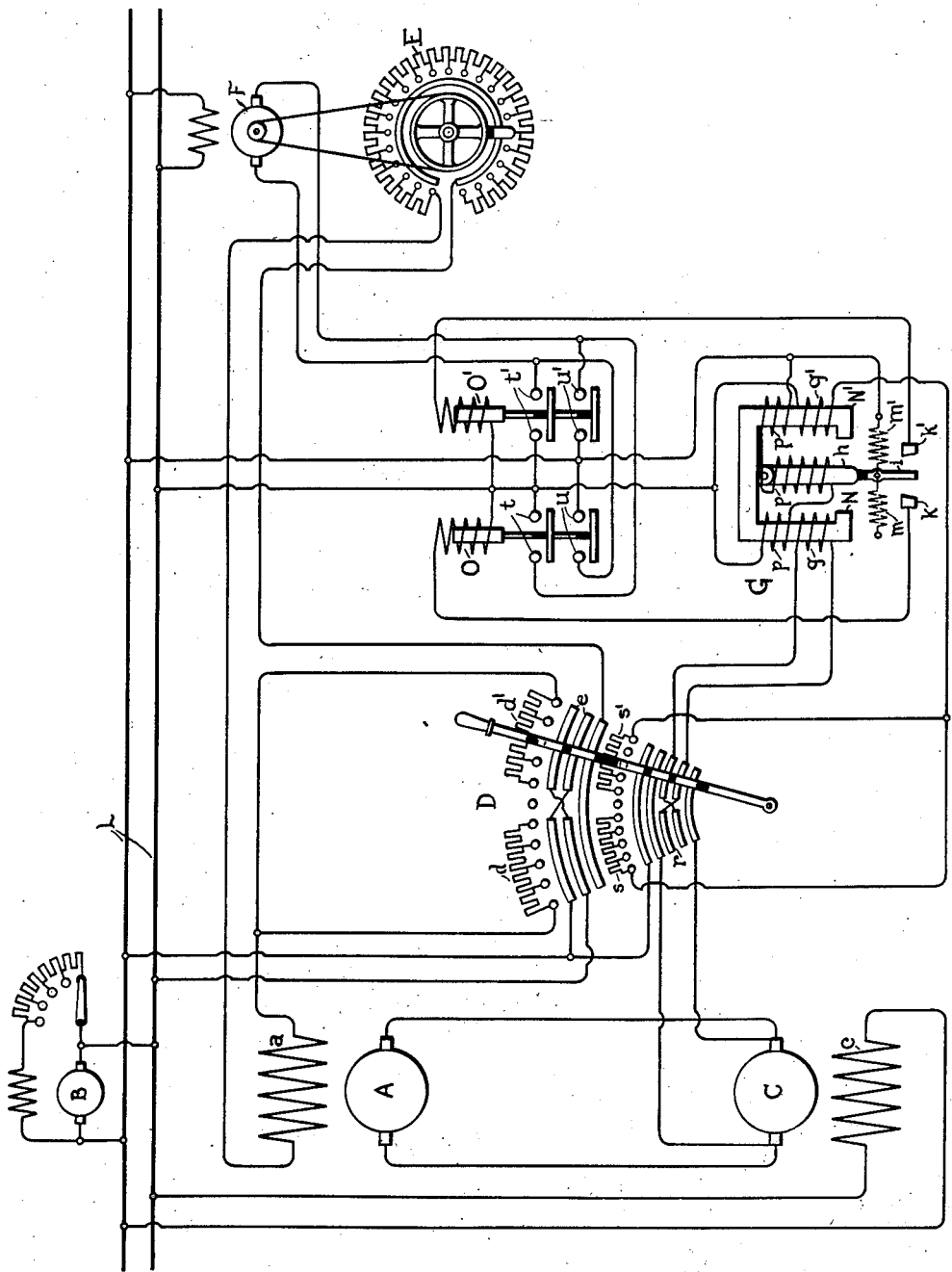
Witnesses:
Irving E. Stees.
J. Ellis Glen.
Inventor
Edmund Krause,
by Albert G. Davis
His Attorney.

UNITED STATES PATENT OFFICE.

EDMUND KRAUSE, OF WAIDMANNSLUST, GERMANY, ASSIGNOR TO GENERAL ELECTRIC COMPANY, A CORPORATION OF NEW YORK.

SYSTEM OF MOTOR CONTROL.

1,025,812. Specification of Letters Patent. Patented May 7, 1912.

Application filed April 11, 1911. Serial No. 620,351.

*To all whom it may concern:*

Be it known that I, EDMUND KRAUSE, a subject of the King of Prussia, residing at Waidmannslust, Germany, have invented certain new and useful Improvements in Systems of Motor Control, of which the following is a specification.

My invention relates to motor control systems and is particularly applicable to systems of control of electric motors used for hoisting and the like.

The system frequently used for hoists comprises the speed control of a direct current motor with a constant field excitation by varying the voltage of a separately excited generator supplying the motor armature. In such systems the speed of the motor is not always the same for corresponding positions of the controller, for instance, the speed in hoisting a load is often lower for a position of the controller than the speed in lowering for a corresponding position of the controller. Because of this variation in speed, the stopping of the hoist at the same point of its travel with different loads becomes very difficult.

My invention has for its object to obviate this difficulty by controlling the speed of the motor so that it is substantially the same for the same or corresponding positions of the controller.

The various features of novelty, which characterize my invention, will be pointed out with particularity in the claims annexed to and forming a part of this specification.

For a better understanding of my invention, reference may be had to the following description taken in connection with the accompanying drawing in which the single figure shows diagrammatically a control system in accordance with my invention.

In the drawing, A represents the armature and $a$ the field winding of a separately excited generator.

B represents a separate exciter, which may consist of any suitable source of current, for instance, of a small generator, as shown, suitably driven.

C represents the armature of a motor supplied with current from the armature A of the generator and $c$ represents the field winding of the motor supplied with constant excitation from the exciter B.

D represents a controller, or control switch, which is arranged to connect the generator field winding $a$ to the bus-bars L, which are supplied with current from the exciter B, through the resistances $d$ or $d'$ and the reversing switch $e$ and thereby vary and reverse the current supplied to the generator field winding. This control switch also performs other functions hereinafter to be described.

In series with the generator field winding $a$ is a resistance E which serves to correct the voltage of generator A and thereby the speed of the motor C. The resistance E may be automatically regulated in any well-known manner, but I have preferred to regulate it by means of a motor F. The motor F is connected in circuit for one or the other direction of rotation, when the speed of the motor varies from its normal value, by means of a contact device or relay G.

The relay G preferably consists of a magnet having two of its arms excited by windings $g$ and $g'$ in such a manner that at their ends like poles are formed, as, for example, two north poles N and N'. The third arm $h$ of this relay is pivotally mounted and has a contact arm $i$ arranged to make contact with one or the other adjustable contacts $k$ or $k'$. As long as the excitation of the windings $g$ and $g'$ are substantially equal, the arm $h$ is held in its middle position by the springs $m$ and $m'$, in which position it plays freely between contacts $k$ and $k'$. If one or the other excitation preponderates, the arm $h$ is deflected to one side or the other, whereby the armature of the motor F is connected in circuit in one or the other direction. As shown in the drawing, the relay G operates the contactors O or O', which, in turn, close the circuit of the motor F in one or the other direction. In order to increase the sensitiveness of the contacting device or relay G at low speeds of the motor C, an additional excitation is provided. The winding $p$ serves this purpose and is disposed on all three arms of the magnet, assisting the windings $g$ and $g'$ on the outer arms to create north poles, for example, and creating a free pole of the opposite polarity on the inner arm. The winding $g$ is preferably connected across the terminals of the motor armature C through a reversing switch $r$ upon the controller D. By thus connecting the winding $g$ this excitation is substantially proportional to the speed of the hoist motor and would be exactly in proportion to the speed of the hoist motor, if it were not for the fall of potential in the motor armature due to its resistance. It would be possible to have the excitation of the winding $g$ exactly proportional to the speed of the motor by connecting it up in a well-known manner to an exciter driven by the motor. Winding $g'$ is excited from the busses L through one or the other of the variable resistances $s$ or $s'$, one or the other of which is varied, and cut in or out by the controller D.

As long as the speed of the hoist motor is substantially normal for a given position of the controller, the excitation of the windings $g$ and $g'$ of the relay G are substantially equal and the contacting arm $i$ plays freely between the contacts $k$ and $k'$, and the motor F remains at rest. If, however, the speed of the motor C varies from its normal value, then one or the other of the excitations produced by the winding $g$ or $g'$ preponderates, and the contact arm $i$ makes connection with the contacts $k$ or $k'$, thereby energizing one of the relays O or O'. The energization of one of these relays connects the motor F in circuit by bridging the contacts $t$ and $u$, or $t'$ and $u'$, and thereby cuts in or out more or less of the resistance E in series with the field winding $a$ of the generator, which weakens or strengthens the excitation of the generator and consequently affects the speed of the hoist motor. The resistance E is connected in the generator field circuit in such a way that the excitation of the field winding $a$ is reduced if the speed of the hoist motor exceeds the normal value, and is increased if the speed of the hoist motor is less than the normal value. The motor F continues to operate until the hoist motor C again reaches normal speed, when the excitations of the relay winding $g$ and $g'$ again become equal and the contact arm $i$ leaves the contact upon which it has rested, opening the circuit of the motor F.

I desire to be understood that my invention is not limited to the specific arrangement of circuits shown and described, and I aim in the appended claims to cover all modifications which do not divert from the spirit and scope of my invention.

What I claim as new and desire to secure by Letters Patent of the United States, is,—

1. In combination, a motor, a generator supplying said motor, a controller for varying the field strength of the generator to vary the voltage supplied to said motor, and means for maintaining the speed of the motor substantially the same for the same or corresponding positions of the controller.

2. In combination, a motor, a generator supplying said motor, a controller for varying the field strength of the generator to vary the voltage supplied to said motor, and means depending on the speed of said motor for maintaining the speed of the motor substantially the same for the same or corresponding positions of said controller.

3. In combination, a motor, a generator supplying said motor, a controller for varying the field strength of the generator to vary the voltage supplied to said motor, and a relay for varying the resistance in the field circuit of said generator depending upon the speed of said motor.

4. In combination, a motor, a generator supplying said motor, a controller for varying the field strength of the generator to vary the voltage supplied to said motor, and a relay for varying the resistance in the field circuit of said generator comprising a coil connected across the armature of said motor.

5. In combination, a motor, a generator supplying said motor, a controller for varying the field strength of the generator to vary the voltage supplied to said motor, and a relay for varying the resistance in the field circuit of said generator, said relay having a coil connected across the armature of said motor and another coil connected in series with a variable resistance across a constant source of excitation.

6. In combination, a motor, a generator supplying said motor, a relay for varying the resistance in the field circuit of said generator, said relay having a coil connected across the armature of said motor and another coil connected in series with a variable resistance across a constant source of excitation, and a controller for varying the field strength of the generator to vary the voltage supplied to said motor, to reverse said motor, to reverse said coil of the relay connected across the armature of said motor, and to vary the resistance in series with said other coil of the relay.

7. In combination, a motor, a generator supplying said motor, a controller for varying the field strength of the generator to vary the voltage supplied to said motor, and means for varying the resistance in the field circuit of said generator comprising a coil connected across the armature of said motor.

8. In combination, a motor, a generator supplying said motor, a controller for varying the field strength of the generator to vary the voltage supplied to said motor, and means for varying the resistance in the field of said generator, said means having a coil connected across the armature of the said motor and another coil connected in series with a variable resistance across a constant source of excitation.

9. In combination, a motor, a generator supplying said motor, means for varying a resistance in the field circuit of said generator, said means having a coil connected across the armature of said motor and another coil connected in series with a variable resistance across a constant source of excitation, and a controller for varying the field strength of the generator to vary the voltage supplied to said motor, to reverse said motor, to reverse the coil of said means connected across the armature of said motor, and to vary the resistance in series with the other coil of said relay.

10. In combination, a separately excited motor, a separately excited generator supplying said motor, a controller for varying the field strength of the generator to vary the voltage supplied to said motor and to reverse said motor, and means for varying the resistance in the field circuit of said generator depending upon the speed of said motor.

11. In combination, a separately excited motor, a separately excited generator supplying said motor, a controller for varying the field strength of the generator to vary the voltage supplied to said motor and to reverse said motor, and means for varying the resistance in the field circuit of said generator comprising a coil connected across the armature of said motor.

12. In combination, a separately excited motor, a separately excited generator supplying said motor, a controller for varying the field strength of the generator to vary the voltage supplied to said motor and to reverse said motor, and means for varying the resistance in the field circuit of said generator, said means having a coil connected across the armature of said motor and another coil connected in series with a variable resistance across a constant source of excitation.

In witness whereof, I have hereunto set my hand this 27th day of March, 1911.

EDMUND KRAUSE.

Witnesses:
WOLDEMAR HAUPT,
HENRY HASPER.